United States Patent
Bussey (10) Patent No.: US 12,028,111 B1
(45) Date of Patent: Jul. 2, 2024

(54) WIRELESS TRANSCEIVER

(71) Applicant: BRITISH TELECOMMUNICATIONS PUBLIC LIMITED COMPANY, London (GB)

(72) Inventor: Liam Bussey, London (GB)

(73) Assignee: British Telecommunications Public Limited Company (GB)

( * ) Notice: Subject to any disclaimer, the term of this patent is extended or adjusted under 35 U.S.C. 154(b) by 0 days.

(21) Appl. No.: 18/556,887

(22) PCT Filed: Mar. 4, 2022

(86) PCT No.: PCT/EP2022/055577
§ 371 (c)(1),
(2) Date: Oct. 23, 2023

(87) PCT Pub. No.: WO2022/228758
PCT Pub. Date: Nov. 3, 2022

(30) Foreign Application Priority Data

Apr. 27, 2021 (GB) ...................................... 2105981

(51) Int. Cl.
*H04B 10/40* (2013.01)
(52) U.S. Cl.
CPC ....... *H04B 10/40* (2013.01); *H04B 2210/006* (2013.01)
(58) Field of Classification Search
CPC .......................... H04B 10/40; H04B 2210/006
USPC ....................................................... 398/115
See application file for complete search history.

(56) References Cited

U.S. PATENT DOCUMENTS

| 7,773,887 | B2 | 8/2010 | Lee et al. | |
| 10,509,065 | B1 | 12/2019 | Shaffer | |
| 10,763,966 | B1* | 9/2020 | Deb | H04B 10/25759 |
| 10,979,147 | B2 | 4/2021 | Gordon et al. | |
| 11,402,479 | B1 | 8/2022 | Pecen et al. | |
| 2019/0187198 | A1 | 6/2019 | Anderson et al. | |
| 2020/0136727 | A1* | 4/2020 | Graceffo | H04B 10/25753 |
| 2020/0295838 | A1 | 9/2020 | Gordon et al. | |
| 2021/0091819 | A1* | 3/2021 | Asuri | H04B 1/406 |
| 2021/0250101 | A1 | 8/2021 | Gordon et al. | |
| 2022/0196716 | A1* | 6/2022 | Anderson | G01R 29/10 |
| 2022/0196719 | A1* | 6/2022 | Walker | G01R 29/12 |

FOREIGN PATENT DOCUMENTS

| CN | 109905177 A | 6/2019 |
| CN | 110518985 A | 11/2019 |
| CN | 108809341 B | 4/2020 |

(Continued)

OTHER PUBLICATIONS

Extended European Search Report received for European Patent Application No. 22189677.2, mailed on Feb. 7, 2023, 9 pages.

(Continued)

*Primary Examiner* — Dalzid E Singh
(74) *Attorney, Agent, or Firm* — Pranger Law PC (57) ABSTRACT

This disclosure provides a first wireless transceiver for a wireless telecommunications network, and a method of operating the first wireless transceiver, such that a combination of a phase-modulated signal and a local oscillator signal cause a detectable change of a probe signal from which a phase state of the phase-modulated signal can be detected.

14 Claims, 8 Drawing Sheets

(56) References Cited

FOREIGN PATENT DOCUMENTS

| CN | 113504415 A | 10/2021 |
|---|---|---|
| GB | 2588754 A | 5/2021 |
| GB | 2606167 A | 11/2022 |
| WO | 2021078438 A1 | 4/2021 |
| WO | 2022017679 A1 | 1/2022 |

OTHER PUBLICATIONS

International Preliminary Report on Patentability received for PCT Patent Application No. PCT/EP2022/055577, mailed on Jul. 24, 2023, 14 pages.
International Search Report and Written Opinion received for PCT Patent Application No. PCT/EP2022/055577, mailed on Jul. 15, 2022, 13 pages.
Office Action received for Great Britain Patent Application No. 2105981.1, mailed on Sep. 16, 2021, 8 pages.
Office Action received for Great Britain Patent Application No. 2211667.7, mailed on Jan. 24, 2023, 6 pages.
Written Opinion of the International Preliminary Examining Authority received for PCT Patent Application No. PCT/EP2022/055577, mailed on May 16, 2023, 7 pages.
Brodnik et al., "Widely Tunable Optical Local Oscillator Scheme for RF Photonic Down-Conversion", IEEE Avionics and Vehicle Fiber-Optics and Photonics Conference (AVFOP), Nov. 2019, 2 pages.
Garcia-Juarez et al., "Optical Heterodyne Technique for Generating and Distributing Microwave Signals", Proc. of SPIE, vol. 7620, Jan. 2010, pp. 1-5.
Gliese et al., "Multifunctional Fiber-Optic Microwave Links Based on Remote Heterodyne Detection", IEEE Transactions on Microwave Theory and Techniques, vol. 46, No. 5, May 1998, pp. 458-468.
Holloway et al., "A Multiple-Band Rydberg-Atom Based Receiver/Antenna: AM/FM Stereo Reception", National Institute of Standards and Technology (NIST), Boulder, CO 80305, Mar. 5, 2019, 10 pages.
Holloway et al., "Detecting and Receiving Phase Modulated Signals with a Rydberg Atom-Based Mixer", National Institute of Standards and Technology, Boulder, CO 80305, USA, Mar. 27, 2019, 5 pages.
Holloway et al., "Detecting and Receiving Phase-Modulated Signals With a Rydberg Atom-Based Receiver", IEEE Antennas and Wireless Propagation Letters, vol. 18, No. 9, Sep. 9, 2019, pp. 1853-1857.
Simons et al., "A Rydberg Atom-Based Mixer: Measuring the Phase of a Radio Frequency Wave", Applied Physics Letters, vol. 114, 114101, Mar. 9, 2019, 4 pages.
Simons et al., "Embedding a Rydberg Atom-Based Sensor into an Antenna for Phase and Amplitude Detection of Radio-Frequency Fields and Modulated Signals", IEEE Access, vol. 7, 2019, pp. 164975-164985.
Wake et al., "Zero-Bias Edge-Coupled InGaAs Photodiodes in Millimetre-Wave Radio-Fibre Systems", Electronics Letters, vol. 29, No. 21, Oct. 14, 1993, pp. 1879-1881.
Simons et al., "Using Frequency Detuning to Improve the Sensitivity of Electric Field Measurements via Electromagnetically induced Transparency and Autler-Townes Splitting in Rydberg Atoms", Applied Physics Letters,. Vol. 108, No. 174101, 2016, 6 pages.

* cited by examiner

WIRELESS TRANSCEIVER

PRIORITY CLAIM

The present application is a National Phase entry of PCT Application No. PCT/EP2022/055577, filed Mar. 4, 2022, which claims priority from GB Patent Application No. 2105981.1, filed Apr. 27, 2021, each of which is hereby fully incorporated herein by reference.

TECHNICAL FIELD

The present disclosure relates to a wireless transceiver for a wireless telecommunications network.

BACKGROUND

In a wireless telecommunications network, a first wireless device may transmit a wireless signal to a second wireless device. Conventional wireless devices utilize RF receivers based on dipole antennas in order to receive the wireless signal. A dipole antenna utilizes metallic conductors in which electrons move along the conductor in response to an incident RF electric field to produce a small current. This current may then be processed (e.g. utilizing electronic circuits, mixers, amplifiers and digitizers) to convert this small current into a demodulated, amplified signal.

In many applications it is desirable to reduce the size of the wireless device, such as by reducing the size of the RF receiver. However, conventional RF receivers based on metallic conductors are limited in size as the relationship between sensitivity, frequency and conductor length means that the RF receiver will not perform adequately below a certain size for a given application. An electrically small antenna is one that is operated at a frequency below its natural resonance, but these are limited by the Chu limit that will set the minimum size for any antenna used at a given frequency. A further limitation for conventional RF receivers is that the ability to sense weak RF signals is dependent on the receiver's gain, which is determined by the design of the antenna. Accordingly, the performance of a conventional antenna is restricted in size, bandwidth and sensitivity.

A new form of RF receiver is based on a Rydberg atom. A Rydberg atom is an atom with one or more electrons excited to a very high principal quantum number. These Rydberg atoms have several useful properties, such as very large dipole moments and long decay periods. These properties can be exploited to create an RF receiver that may receive and demodulate Amplitude-Modulated (AM). Frequency-Modulated (FM) and Phase Modulated (PM) RF electric fields over very large frequency ranges (e.g. from hundreds of MHz to 1 THz).

Figure 1:
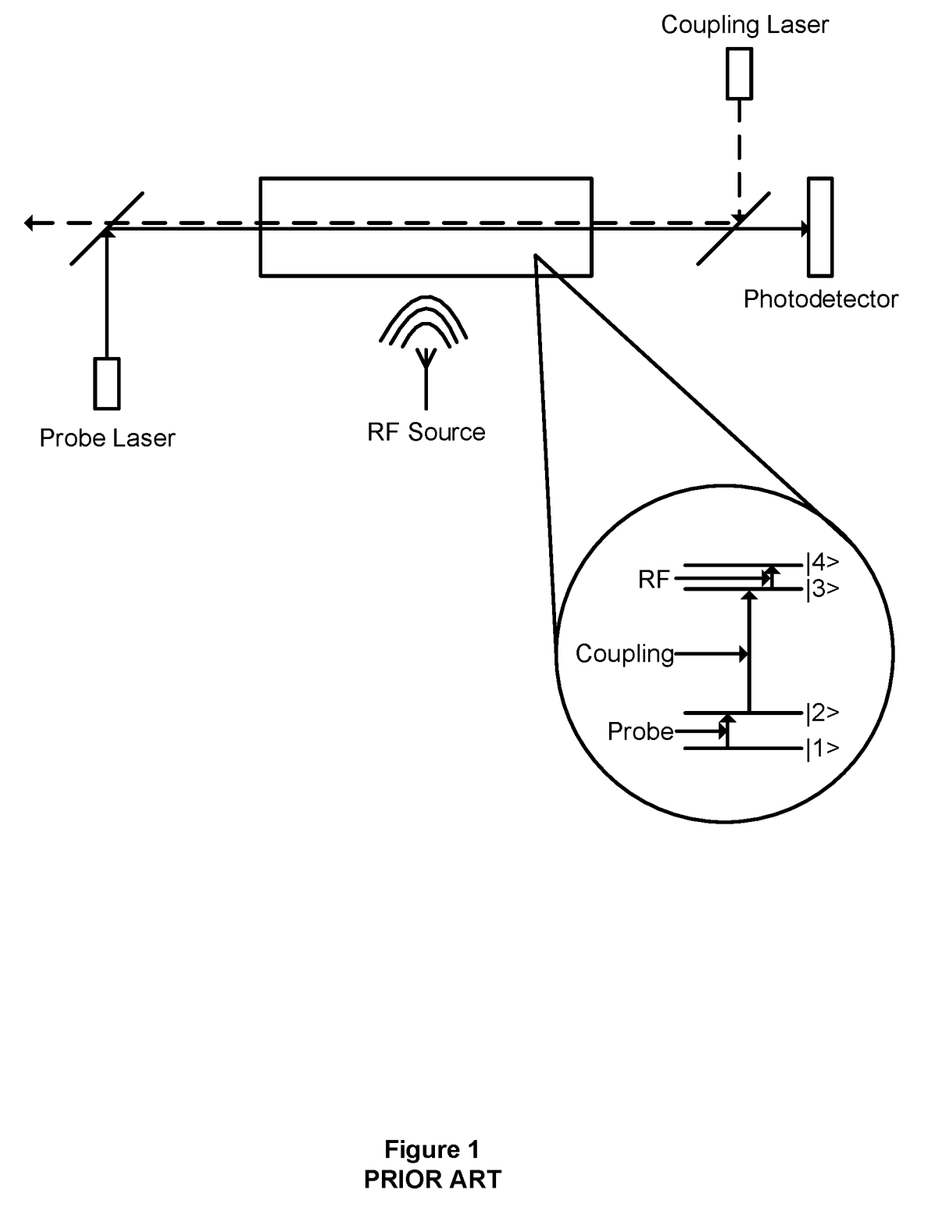
FIG. 1 is a schematic diagram of a conventional Rydberg-atom based Radio Frequency (RF) receiver.

An example Rydberg-atom based RF receiver is shown in FIG. 1 and operates as follows. An atomic medium is provided which, in this example, is a glass cell filled with a low density vapor of alkali atoms (such as Rubidium-85). Each Rubidium-85 atom has a number of electron states, including the ground state ($|1>$) and a plurality of excited states. The outer electron of the Rubidium-85 atom may be excited (e.g. by absorbing a photon of a particular wavelength) from the ground state ($|1>$) to an excited state. The electron may then decay from the excited state to a lower excited state (that is, an excited state at a lower energy level) or to the ground state ($|1>$). However, some of these transitions are not allowed as they are dipole forbidden.

In the RF receiver, a first laser (known as a "probe" laser) is passed through the atomic medium at a first wavelength which corresponds to the energy required to elevate the Rubidium-85 atom's outer electron from its ground state ($|1>$) to a first excited state ($|2>$). A second laser (known as a "coupling" laser) is also passed through the atomic medium in an opposing direction at a relatively large power level (compared to the probe laser) and at a second wavelength which corresponds to the energy required to elevate the Rubidium-85 atom's outer electron from the first excited state ($|2>$) to a Rydberg state ($|3>$). The transition from the Rydberg state ($|3>$) to the ground state ($|1>$) is forbidden so that the ground state ($|1>$) becomes depopulated and so fewer atoms can absorb the probe laser operating at the first wavelength. Accordingly, the atomic medium becomes more transparent to the probe laser such that there is an increase in transmission of the probe laser, which is observable at an optical detector. This phenomenon is known as Electromagnetically Induced Transparency (EIT) and the received signal is known as the EIT signal. Specifically, the above description is of a ladder scheme EIT effect, but the skilled person would understand that the EIT effect may be realized through alternative electron transitions, such as the Vee and Lambda schemes.

Once the atomic medium has become transparent to the probe laser, then a further physical effect can be exploited to detect RF electric fields. As the Rubidium-85 atom's outer electron is much further away from the atomic nucleus when in the Rydberg state compared to the ground state, a large dipole moment is created and it becomes responsive to incident RF electric fields. An incident RF electric field may cause a further transition of an electron from the Rydberg state to another Rydberg state. If the transition from the other Rydberg state to the ground state is not forbidden, then electrons may subsequently drop to the ground state so that the atomic medium becomes less transparent to the probe laser, causing a drop in amplitude of the EIT signal. This drop in amplitude of the EIT signal is directly proportional to the incident RF electric field's amplitude, thus creating a Rydberg-atom based AM RF receiver. A more detailed explanation of this effect can be found in the article. "A Multiple-Band Rydberg-Atom Based Receiver/Antenna: AM/FM Stereo Reception". Holloway et al., National Institute of Standards and Technology).

Furthermore, a Rydberg-atom based FM RF receiver works in a similar manner. That is, when the RF electric field changes (or "detunes") from its resonant RF transition frequency, the EIT signal (on a graph of the EIT signal against probe laser detuning) splits into two non-symmetrical peaks. The separation of the two peaks increases with RF detuning. By locking the probe laser and coupling laser to particular frequencies, then the optical detector output is directly correlated to the FM RF electric field. A more detailed explanation of this effect can also be found in article, "A Multiple-Band Rydberg-Atom Based Receiver/ Antenna: AM/FM Stereo Reception". Holloway et al., National Institute of Standards and Technology) and in article. "Using frequency detuning to improve the sensitivity of electric field measurements via electromagnetically induced transparency and Autler-Townes splitting in Rydberg atoms" Appl. Phys. Lett. 108, 174101 (2016), Matt T. Simons.

Rydberg RF receivers may also be used to detect phase modulated RF fields, such as those of Binary Phase-Shift Keying (BPSK), Quadrature Phase-Shift Keying (QPSK), and Quadrature Amplitude Modulation (QAM) signals (used in many wireless and cellular communications protocols). In these modulation schemes, data is transmitted by modulating the phase of a carrier. To detect the carrier's phase, a reference RF field being on-resonance with the transition to the Rydberg state is applied to the atomic medium, which acts as a local oscillator. The difference frequency, or "intermediate frequency", is detected and the phase of the intermediate frequency signal corresponds directly to the relative phase between the local oscillator and the incident RF electric field.

Regardless of the modulation scheme used (amplitude, frequency or phase), the Rydberg atom based RF detector may be configured to detect RF fields of a specific frequency by selecting a particular second wavelength of the coupling laser so that the electrons of the atomic medium are elevated to a particular Rydberg state. This Rydberg state is selected so that photons at the specific frequency to be detected will elevate electrons from this Rydberg state to another Rydberg state, thus creating a detectable change in the EIT signal that may be observed at the optical detector. The magnitude of the EIT signal, known as the "modulation depth", is the difference between the depth of the drop in amplitude of the EIT signal when there is an incident RF electric field and when there is no incident RF electric field.

SUMMARY

According to a first aspect of the disclosure, there is provided a first wireless transceiver for a wireless telecommunications network, the wireless telecommunications network having a second wireless transceiver, wherein communications from the first wireless transceiver to the second wireless transceiver occur during a first timeslot and communications from the second wireless transceiver to the first wireless transceiver occur during a second timeslot, the first wireless transceiver comprising: a transmitter configured to transmit data to the second wireless transceiver during the first timeslot and further configured to transmit a local oscillator signal during the second timeslot; and an electromagnetic field receiver, the electromagnetic field receiver including a first optical transmitter, a second optical transmitter, and a transmission medium, wherein the first optical transmitter is configured to transmit a probe signal via the transmission medium at a probe frequency and the second transmitter is configured to transmit a coupling signal via the transmission medium at a coupling frequency, wherein the probe frequency is set to excite electrons of the transmission medium from a ground state to a first excited state and the coupling frequency is set to excite electrons of the transmission medium to a predetermined excited state so as to induce an Electromagnetic Induced Transparency, EIT, effect, wherein the electromagnetic field receiver is configured to receive, at the transmission medium and during the second timeslot, a phase-modulated signal from the second wireless transceiver and the local oscillator signal from the transmitter, wherein a combination of the phase-modulated signal and the local oscillator signal causes a detectable change of the probe signal from which a phase state of the phase-modulated signal can be detected.

The transmitter may be configured to transmit data to the wireless device in a forward-facing main lobe and transmit the local oscillator signal in a rear-facing lobe.

The first wireless transceiver may further comprise an optical receiver for receiving the probe signal following the change caused by the combination of the phase-modulated signal and the local oscillator signal; and a processor configured to analyze the received probe signal to detect the phase state of the phase-modulated signal.

The phase-modulated signal may be further modulated by amplitude and the processor may be further configured to analyze the received probe signal to detect the amplitude of the phase-modulated signal.

The first wireless transceiver may be a base station for a cellular telecommunications network. The base station may further comprise a backhaul communications interface configured to receive the probe signal, following the change caused by the combination of the phase-modulated signal and the local oscillator signal, and communicate the received probe signal to a core network of the cellular telecommunications network. The base station may further comprise a wavelength converter configured to convert the received probe signal to a wavelength between 1260 nm and 1625 nm, wherein the wavelength converted received probe signal may be communicated to the core network.

According to a second aspect of the disclosure, there is provided a method of operating a first wireless transceiver in a wireless telecommunications network, the wireless telecommunications network having a second wireless transceiver, wherein communications from the first wireless transceiver to the second wireless transceiver occur during a first timeslot and communications from the second wireless transceiver to the first wireless transceiver occur during a second timeslot, wherein the first wireless transceiver comprises a transmitter and an electromagnetic field receiver, the electromagnetic field receiver including a first optical transmitter, a second optical transmitter, and a transmission medium, the method comprising: transmitting, by the first optical transmitter, a probe signal through the transmission medium at a probe frequency set to excite electrons of the transmission medium from a ground state to a first excited state; transmitting, by the second optical transmitter, a coupling signal through the transmission medium at a coupling frequency set to excite electrons of the transmission medium to a predetermined excited state so as to induce an Electromagnetic Induced Transparency, EIT, effect; transmitting, by the transmitter, data to the second wireless transceiver during the first timeslot and a local oscillator signal during the second timeslot; and receiving, at the transmission medium of the electromagnetic field receiver and during the second timeslot, a phase-modulated signal from the second wireless transceiver and the local oscillator signal from the transmitter, wherein a combination of the phase-modulated signal and the local oscillator signal causes a detectable change of the probe signal from which a phase state of the phase-modulated signal can be detected.

The first wireless transceiver may further comprise an optical receiver and a processor, and the method may further comprise: receiving, at the optical receiver, the probe signal following the change caused by the combination of the phase-modulated signal and the local oscillator signal; and analyzing, at the processor, the received probe signal to detect the phase state of the phase-modulated signal.

The phase-modulated signal may be further modulated by amplitude and the method may further comprise analyzing, at the processor, the received probe signal to further detect the amplitude of the phase-modulated signal.

The first wireless transceiver may be a base station of a cellular telecommunications network and further comprises a backhaul communications interface, and the method may further comprise: receiving, at the backhaul communications interface, the probe signal following the change caused by the combination of the phase-modulated signal and the local oscillator signal; and communicating, by the backhaul communications interface, the received probe signal to a core network of the cellular telecommunications network.

The first wireless transceiver may further comprise a wavelength converter, and the method may further comprise: converting, by the wavelength converter, the received probe signal to a wavelength between 1260 nm and 1625 nm, wherein the wavelength converted received probe signal may be communicated to the core network.

According to a third aspect of the disclosure, there is provided a computer program comprising instructions which, when the program is executed by a computer, cause the computer to carry out the method of the second aspect of the disclosure. The computer program may be stored on a computer readable carrier medium.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

A first embodiment of a wireless telecommunications network of the present disclosure will now be described with reference to FIGS. 2 to 5. The wireless telecommunications network of this first embodiment is a cellular telecommunications network having a base station 100 and a User Equipment, UE, 200. The network employs a Time-Division-Duplexing (TDD) technique to permit bi-directional communication between the base station 100 and UE 200. The network is therefore configured to communicate according to a time frame structure in which the time frame is divided into a plurality of timeslots, wherein a first subset of the plurality of timeslots are for downlink transmissions (that is, from the base station 100 to the UE 200) and a second subset of the plurality of timeslots are for uplink transmissions (that is, from the UE 200 to the base station 100). The base station 100 and UE 200 are time synchronized (or at least frame synchronized) so that a start of a time frame in each entity is at a common time. This synchronization is achieved by use of an atomic clock, such as a Rubidium or Cesium based atomic clock, in the base station 100 and by distribution of a synchronization signal from the base station 100 to the UE 200 during connection establishment. A symbol rate is also communicated from the base station 100 to the UE 200 during connection establishment, which is thereafter used in communications between the base station 100 and UE 200. The synchronization may be periodically updated by periodically distributing synchronization signals so as to correct any clock drift between the base station 100 and UE 200.

Figure 3:
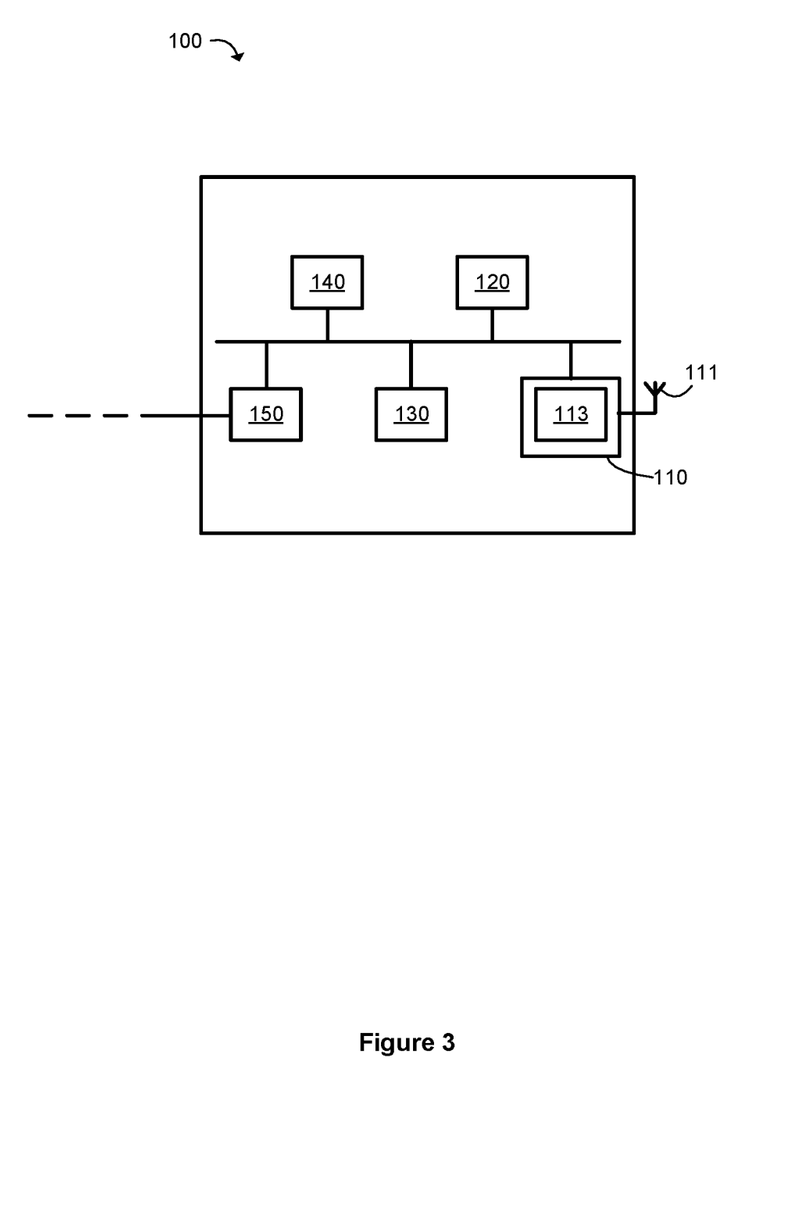
FIG. 3 is a schematic diagram of a base station of the network of FIG. 2.

The base station 100 is shown in more detail in FIG. 3. The base station 100 is a wireless transceiver having both a Radio Frequency (RF) transmitter 110, an RF receiver 120, a processor 130, memory 140 and a backhaul communications interface 150.

The RF transmitter 110 includes an antenna 1i1 and a transmitter processing module 113. The transmitter processing module 113 is configured for processing data (e.g. stored in memory 140 or received from the backhaul communications interface 150) for transmission by the antenna 111. This is explained in more detail below.

Figure 4:
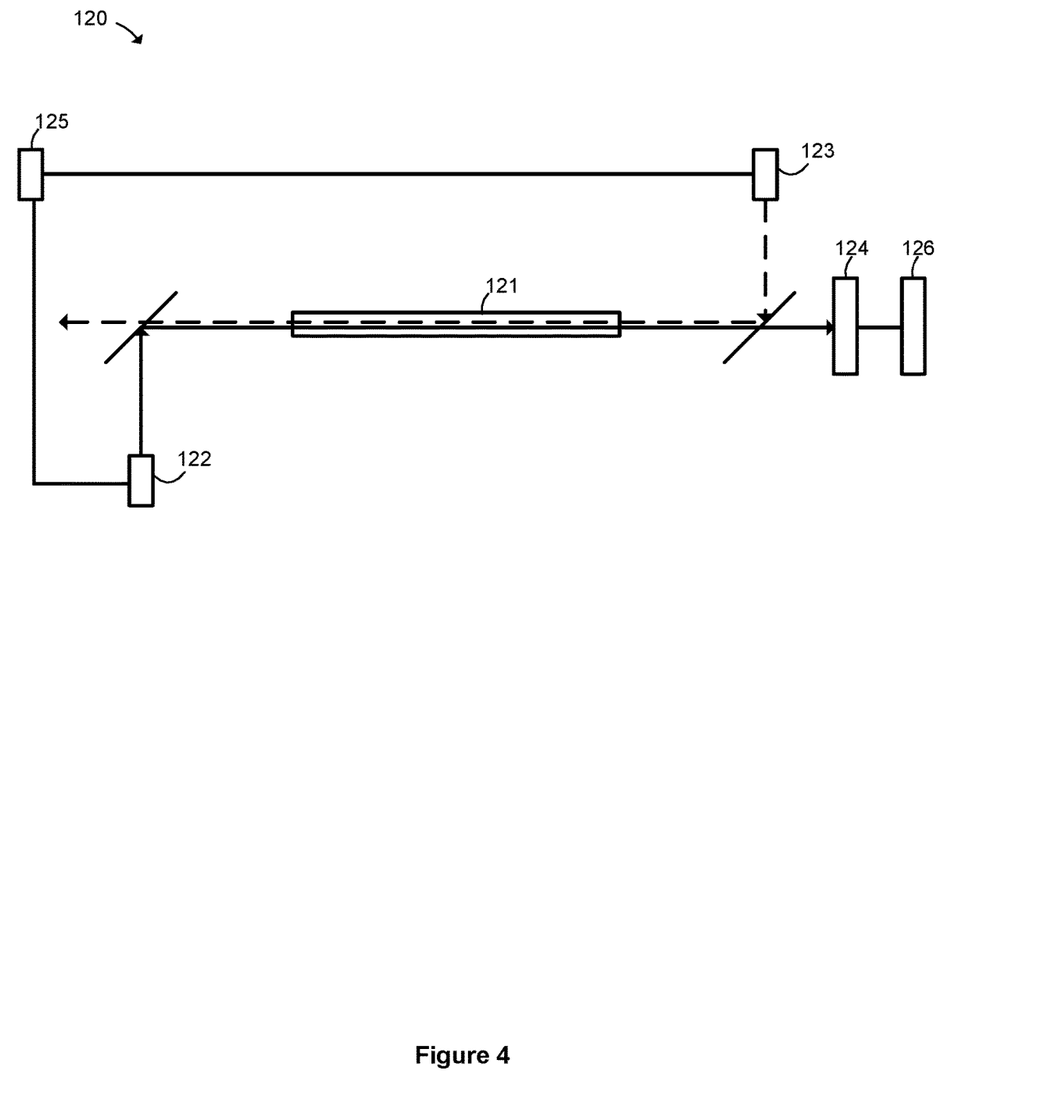
FIG. 4 is a schematic diagram of an RF receiver of the base station of FIG. 3.

As shown in more detail in FIG. 4, the RF receiver 120 is a Rydberg-atom based RF receiver and includes an optical fiber 121, a probe laser 122 for transmitting a probe signal along the optical fiber 121 (illustrated by a solid arrowed line in FIG. 4), a coupling laser 123 for transmitting a coupling signal along the optical fiber 121 (shown by a dashed arrowed line in FIG. 4, counter-propagating and overlapping the probe signal), a photodetector 124, a controller 125 and a receiver processing module 126. The receiver processing module 126 is configured for processing a signal of the photodetector 124 and, in this embodiment, is a Vector Signal Analyzer (VSA). The optical fiber 121 includes an optical cavity containing a vapor of alkali metal (in this embodiment. Rubidium-85). The controller 125 is for controlling a frequency of the probe signal (i.e. to adjust and/or stabilize the frequency of the probe signal), for controlling a frequency of the coupling signal (i.e. to adjust and/or stabilize the frequency of the coupling signal), for controlling an intensity of the probe laser 122 (i.e. the transmission power and/or cross-sectional area of the probe laser 122), and for controlling an intensity of the coupling laser 123 (i.e. the transmission power and/or cross-sectional area of the coupling laser 123).

The backhaul communications interface 150 shown in FIG. 3 connects the base station 100 via an optical fiber link) to a core network (not shown). Data for the base station 100 and UE 200 shown in FIG. 2 may be communicated via this backhaul communications interface.

As noted above, the network is configured for bi-directional communication between the base station 100 and UE 200. For downlink communications (from the base station 100 to the UE 200), this is achieved by the base station 100 transmitting data (such as locally stored data or data received from the core network) by the RF transmitter 110 during the first subset of the plurality of timeslots. The UE 200 is similarly configured to receive the data transmitted by the base station 100 in the first subset of the plurality of timeslots.

For uplink communications (from the UE 200 to the base station 100), the UE 200 transmits wireless signals, in which data is modulated to the wireless signals using a 16-Quadrature Amplitude Modulation (QAM) modulation scheme, during the second subset of the plurality of timeslots. These wireless signals are transmitted at a frequency of around 3.5 GHz. The RF transmitter 110 of the base station 100 is also configured to transmit a local oscillator signal during the second subset of the plurality of timeslots so as to enable the RF detector 120 of the base station 100 to detect the phase-modulated wireless signals transmitted by the UE 200 (this is discussed in more detail below). The local oscillator signal has a constant amplitude and phase during each timeslot of the second subset of timeslots. The frequency of the local oscillator signal is slightly off-resonance with the frequency of the UE's transmissions. In this embodiment, the local oscillator signal has a frequency of 3.50000 GHz, and the frequency of the UE's transmissions is 3.50003 GHz (such that the frequency difference is 30 kHz).

Figure 2:
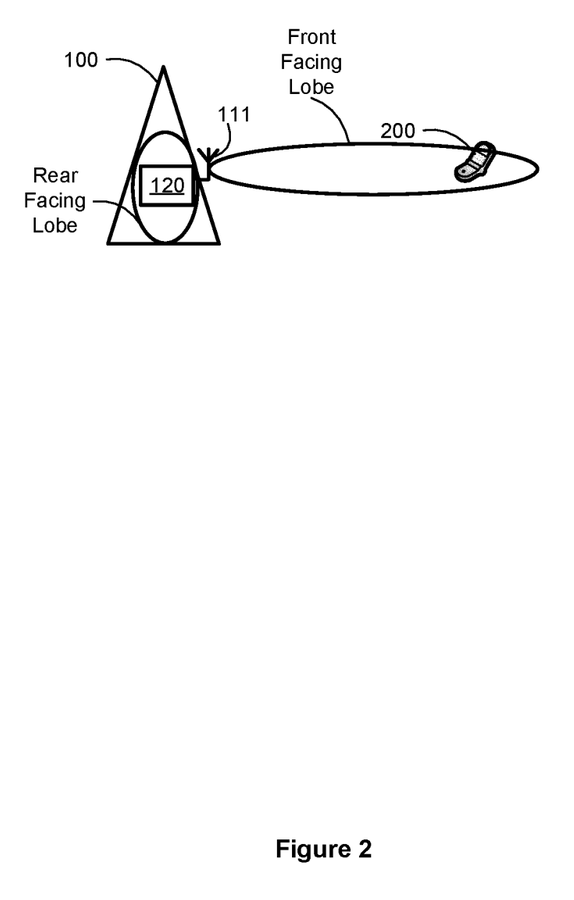
FIG. 2 is a schematic diagram of a wireless telecommunications network of a first embodiment of the present disclosure.

FIG. 2 illustrates the transmission coverage areas of the antenna 111. In this embodiment, the antenna 111 has a forward-facing main lobe that covers a geographical region in which users are served by the base station 100 and therefore carries control and user plane data for these users (e.g. UE 200). The antenna 111 also has a rear-facing lobe that covers the RF receiver 120 and carries the local oscillator signal. The transmission power of the antenna 111 may be configured such that, during the second subset of timeslots, the rear-facing lobe covers the RF receiver 120 and a coverage area of the front-facing lobe is significantly smaller than its coverage area during the first subset of timeslots (so as to reduce interference between the local oscillator signal transmitted by the antenna 111 and the wireless signal transmitted by the UE 200).

Returning to FIG. 4, the RF receiver 120 is configured to detect these phase-modulated wireless signals by configuring the probe laser 122 of the RF receiver 120 to transmit a probe signal through the optical fiber 121, thus exciting electrons of the Rubidium-85 atoms of the optical cavity of the optical fiber 121, and by configuring the coupling laser 123 of the RF receiver 120 to transmit a coupling signal through the optical fiber 121 (counter-propagating and overlapping the probe signal), thus also exciting electrons of the Rubidium-85 atoms in the optical cavity of the optical fiber 121. The frequency of the probe signal is set to correlate with the transition of an electron of a Rubidium-85 atom from a ground state to a first excited state, and the frequency of the coupling signal is set to correlate with the transition of an electron of a Rubidium-85 atom from the first excited state to a predetermined Rydberg state. The predetermined Rydberg state is selected (based on the specific frequencies of the probe and coupling signals) so that a wireless signal, having a particular frequency, incident upon the optical cavity of the optical fiber 121 excites electrons from the predetermined Rydberg state to another Rydberg state, causing a detectable change in the Electromagnetically Induced Transparency (EIT) signal at the photodetector 124. In this embodiment, in which the UE 200 transmits wireless signals at around 3.5 GHz, the probe frequency is 780 nm and the coupling frequency is 480 nm so that electrons are excited to the $84^{th}$ Rydberg state.

As noted above, the RF transmitter 110 shown in FIG. 3 is configured to transmit a local oscillator signal during the second subset of the plurality of timeslots. The local oscillator signal and the wireless signal have a frequency correlating with the transition from the predetermined Rydberg state to the other Rydberg state. The superposition of the local oscillator signal and the wireless signal at the optical cavity of the optical fiber 121 shown in FIG. 4 modifies the probe signal such that the phase and amplitude of the wireless signal can be detected. This detection technique has been discussed in several papers, such as "A Rydberg Atom-Based Mixer: Measuring the Phase of a Radio Frequency Wave", Matthew T. Simons et al., and "Detecting and Receiving Phase Modulated Signals with a Rydberg Atom-Based Mixer". Christopher L. Holloway et al. A brief overview of the theory behind this detection will now be presented.

The total electric field, $E_{atrons}$, experienced by the atomic medium in the optical cavity of the optical fiber 121 is the sum of the electric field of the local oscillator signal, $E_1$, and the electric field of the wireless signal from the UE 200, $E_2$:

$$E_{atrons}=E_1+E_2 \qquad (1)$$

The electric field strength of the local oscillator signal and the electric field strength of the wireless signal may be defined as:

$$E_1=E_{LO}\cos(\omega_{LO}t+\phi_{LO}) \qquad (2)$$

$$E_2=E_{SIG}\cos(\omega_{SIG}t+\phi_{SIG}) \qquad (3)$$

In which:
$E_{LO}$ and $E_{SIG}$ represent the maximum electric field strengths of the local oscillator signal and the wireless signal respectively.
$\omega_{LO}$ and $\omega_{SIG}$ represent the angular frequencies of the local oscillator signal and the wireless signal respectively,
t represents time, and
$\phi_{LO}$ and $\phi_{SIG}$ represent the phases of the local oscillator signal and the wireless signal respectively.

As the difference between the frequency of the local oscillator signal and the frequency of the wireless signal is much less than an average of these frequencies (i.e. $(\omega_{LO}+\omega_{SIG})/2$), then the total electric field may be expressed as:

$$E_{atrons}=\cos(\omega_{LO}t+\phi_{LO})\cdot\sqrt{E_{LO}^2+E_{SIG}^2+2E_{LO}E_{SIG}\cos(\Delta\omega t+\Delta\phi)} \qquad (4)$$

In which:
$\Delta\omega$ is the difference between the angular frequency of the local oscillator signal and the angular frequency of the wireless signal (i.e. $\omega_{LO}-\omega_{SIG}$), and
$\Delta\phi$ is the difference between the phase of the local oscillator signal and the phase of the wireless signal (i.e. $\phi_{LO}-\phi_{SIG}$).

The Rubidium-85 atoms of the optical cavity of the optical fiber 121 demodulate the high frequency field, WO, such that the received probe signal. $T_{probe}$, as a function of time is given by:

$$T_{probe}\propto |E_{atoms}|\approx E_{LO}+E_{SIG}\cos(\Delta\omega t+\Delta\phi) \qquad (5)$$

The received probe signal therefore has a sinusoidal form with a frequency being the difference between the frequency of the local oscillator signal and the frequency of the wireless signal ($\Delta\omega$) and a phase being the difference between the phase of the local oscillator signal and the phase of the wireless signal ($\Delta\phi$). Accordingly, by measuring the relative phase shift of the received probe signal over time, the phase state of the wireless signal can be determined. Furthermore, an amplitude of the probe is a function of both the electric field strength of the local oscillator signal and the electric field strength of the wireless signal, such that the amplitude of the wireless signal may be determined from the amplitude of the received probe signal. In more detail, for modulation schemes that utilize a plurality of amplitudes (in addition to phase) to identify a symbol, then each distinct amplitude of the plurality of amplitudes as transmitted by the UE 200 causes a distinct amplitude in the received probe signal as measured by the base station 200.

Figure 5:
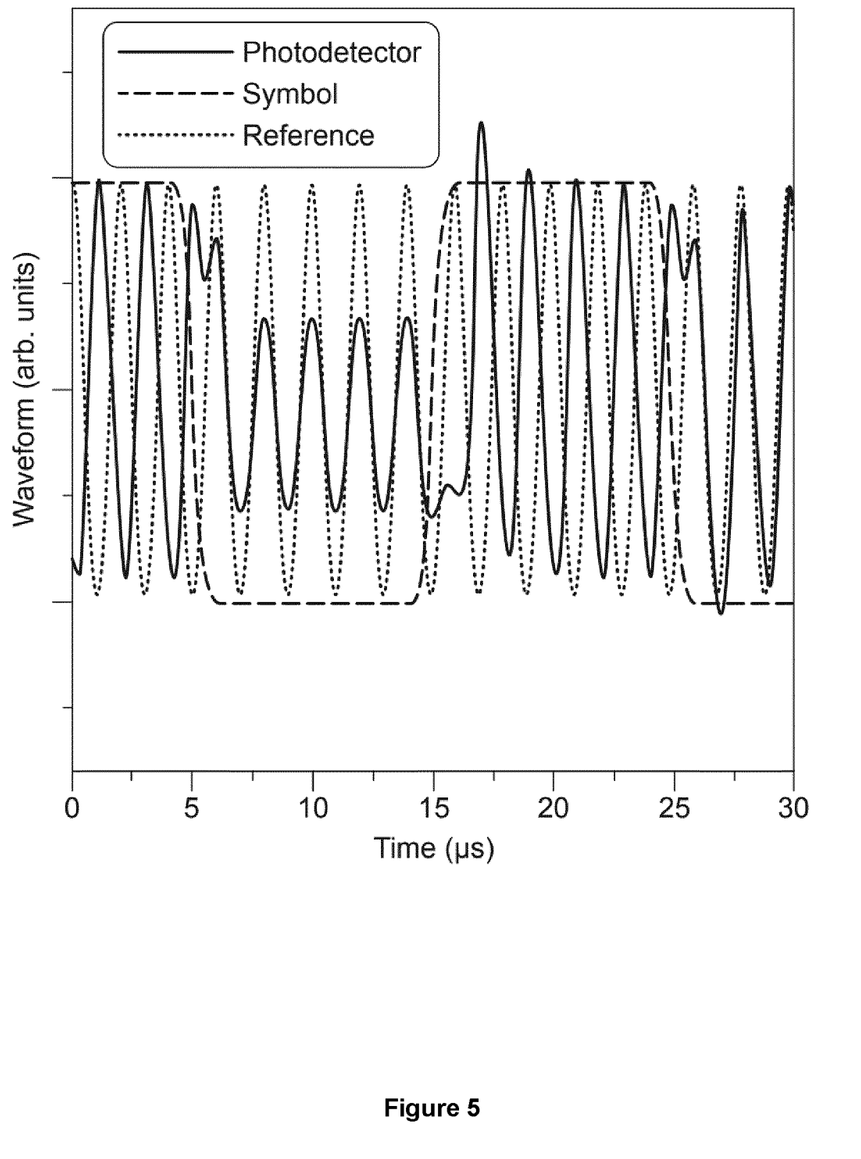
FIG. 5 is a graph illustrating a probe signal detected by the RF receiver of FIG. 4.

FIG. 5 is a graph of an example received probe signal against time for a plurality of symbols. The received probe signal is illustrated by the solid line and, as noted above, has a frequency equal to the difference between the frequency of the local oscillator signal and the frequency of the wireless signal. The graph also illustrates a reference signal in the short-dashed line having the same frequency as the received probe signal but has a constant phase (so as to illustrate a phase shift of the received probe signal), and a symbol interval in the long-dashed line defining the bounds of each symbol interval. This graph illustrates a series of symbol intervals in which the phase shift (between the received probe signal and the reference signal) in each symbol interval determines the phase state of that symbol in the wireless signal and the amplitude of the received probe signal in each symbol interval determines the amplitude of that symbol in the wireless signal.

In this embodiment, VSA 126 shown in FIG. 4 is configured to monitor the received probe signal during the second subset of the plurality of timeslots in order to detect the phase state and amplitude of each symbol of the (16-QAM) phase-modulated wireless signal transmitted by the UE 200, and demodulate the data contained in these phase-modulated signals into a data stream. The demodulated data stream may then be processed locally by the base station 100 or transmitted to the core network via the backhaul communications interface 150 shown in FIG. 3.

This first embodiment of the present disclosure therefore enables the base station 100 to utilize a Rydberg-atom based RF receiver, having its preferential technical benefits such as broad frequency range and high sensitivity compared to a conventional dipole antenna receiver, to receive phase-modulated wireless signals. Furthermore, this benefit is achieved without introducing additional hardware to provide the local oscillator signal as the same antenna that is used for downlink communications is utilized for the local oscillator signal.

Figure 6:
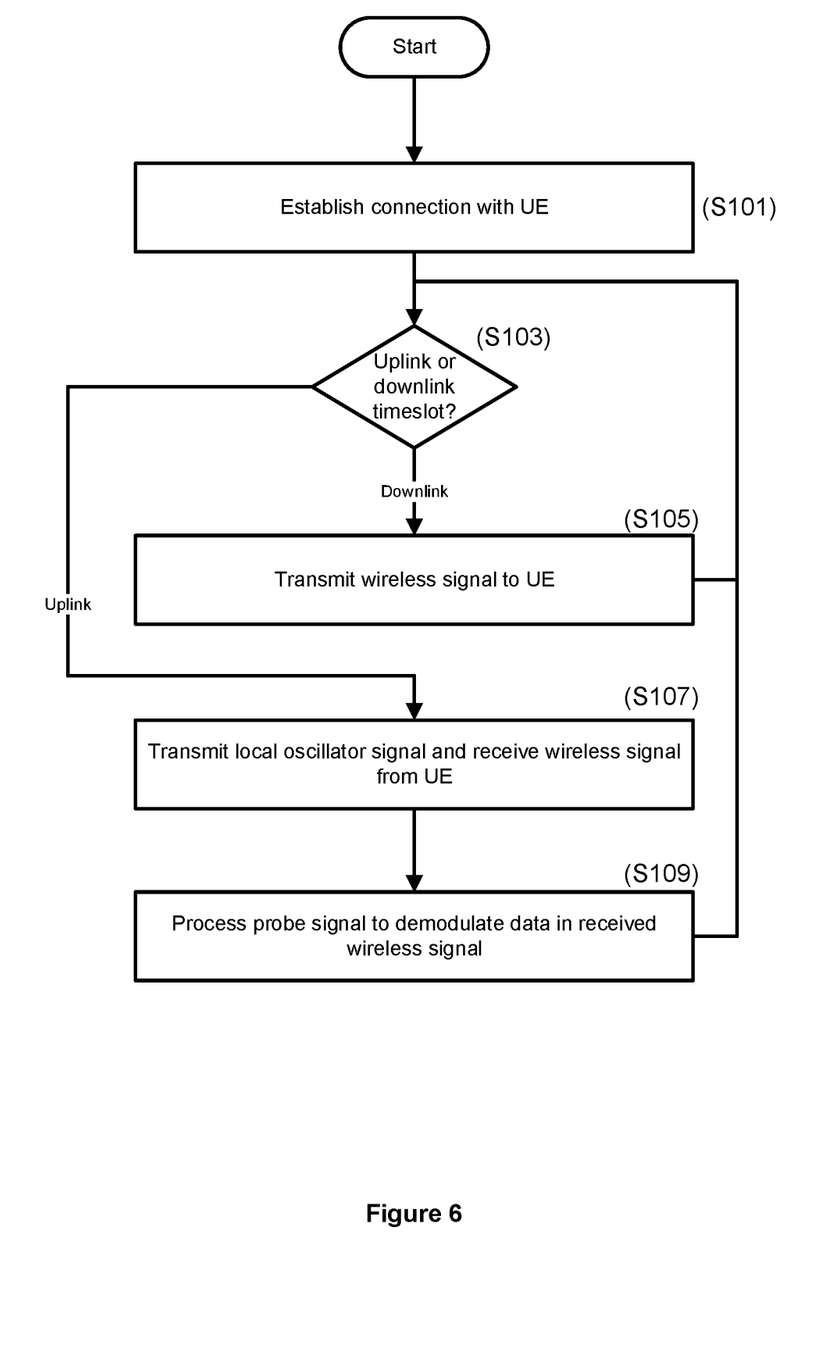
FIG. 6 is a flow diagram illustrating a first embodiment of a method of the present.

A first embodiment of a method of the present disclosure will now be described with reference to FIG. 6. In S101, the base station 10 establishes a connection with the UE 200 and adopts a time frame structure for communication, wherein the time frame includes a first set of timeslots for downlink communication and a second set of timeslots for uplink communication. In S103, the base station 100 determines whether it is entering a timeslot of the first set of timeslots for downlink communication or the second set of timeslots for uplink communication. In a first example, the base station 100 is entering a timeslot of the first set of timeslots and so proceeds to S105 in which it is configured to transmit wireless signals to the UE 200. At the end of the timeslot, the method loops back to S103. In a second example of S103, the base station 100 enters a timeslot of the second set of timeslots and so proceeds to S107 in which it is configured to 1) transmit a local oscillator signal and 2) receive the wireless signals from the UE 200. In S109, the VSA 126 of the base station 100 processes the received probe signal (as modified by the combination of the local oscillator signal and the wireless signal transmitted by the UE 200) and demodulates the data contained within the wireless signal. At the end of the timeslot, the method loops back to S103.

Figure 7:
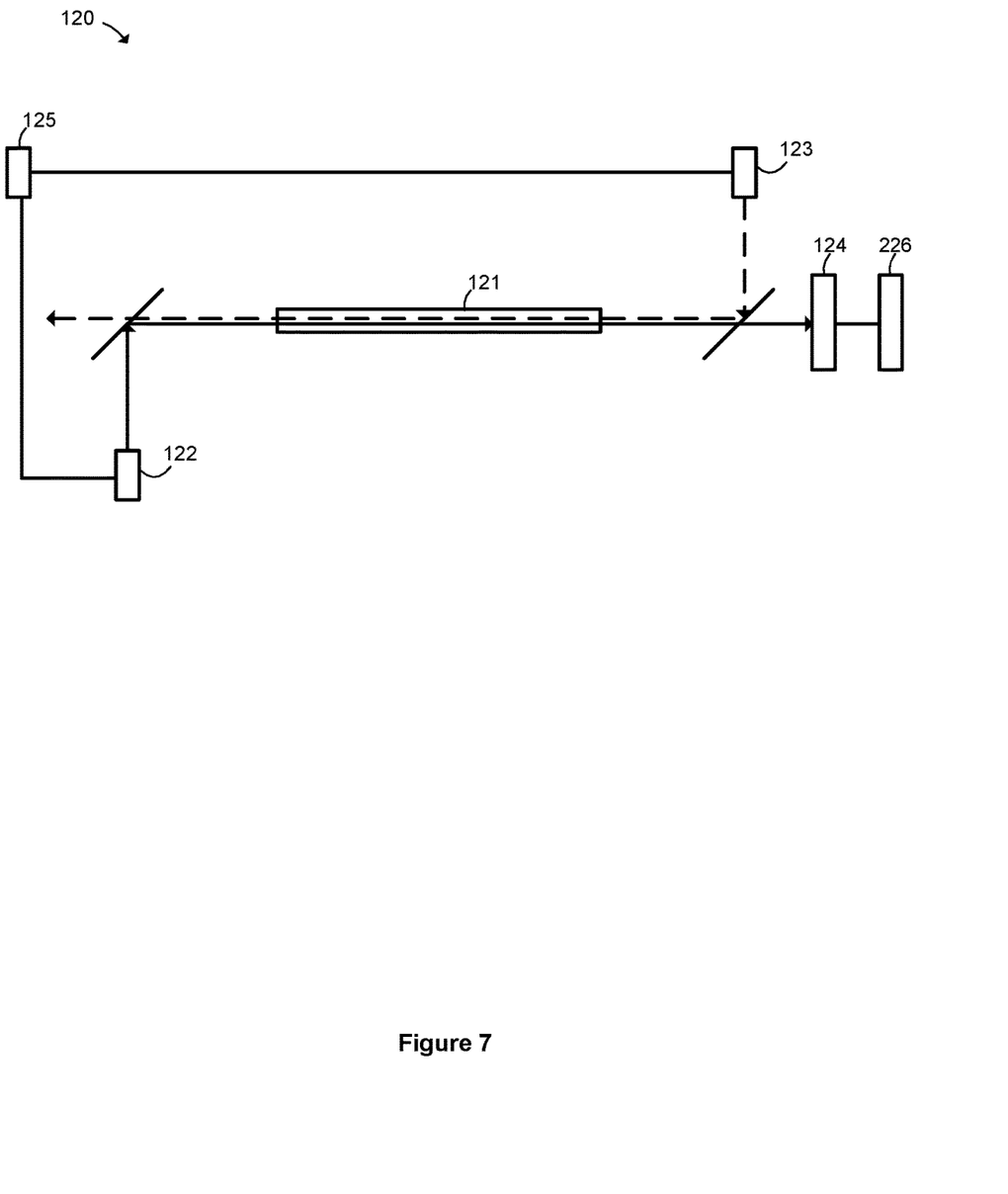
FIG. 7 is a schematic diagram of an RF receiver of a base station of a wireless telecommunications network of a second embodiment of the present disclosure.

A second embodiment of a wireless telecommunications network of the present disclosure will now be described with reference to FIG. 7 (which illustrates an RF receiver of a base station of this second embodiment). This second embodiment is very similar to the first embodiment and the same reference numerals will be used for like-for-like components. This second embodiment differs from the first embodiment above in that the received probe signal is not processed at the base station 100 (such that the receiver processing module 226 of the RF receiver 120 of the second embodiment does not implement a VSA to analyze the probe signal). Instead, the probe signal is directed to the backhaul communications interface 150 for onward transmission to the core network. In this second embodiment, the received probe signal (and the data which is contained in the received probe signal due to the combination of the local oscillator signal and wireless signal at the optical cavity of the optical fiber) are therefore transported to the core network for demodulation into a demodulated data stream (e.g. by use of a VSA in the core network).

In this second embodiment, the backhaul communications interface 150 includes a Periodically Poled Non-Linear (PPNL) optical waveguide which converts the frequency of the probe signal from 780 nm to 1560 nm. The difference signal is then carried on this 1560 nm signal. The 1560 nm signal is then passed to a Dense Wavelength Division Multiplexing (DWDM) grid for transmission to the core network.

This second embodiment of the present disclosure therefore benefits from a reduction in resource requirements for a base station for receiving phase-modulated wireless signals and transmitting the demodulated data stream from these wireless signals to the core network. That is, conventional base stations that utilize a dipole antenna for receiving phase-modulated wireless signals must demodulate the data stream from the received signals (which is carried out in the electrical domain) and convert this data stream to the optical domain in order to transmit the data stream to the core network via the backhaul communications interface. The processing resources required to perform such conversion adds a capital and operational (e.g. energy) cost to the base station. Furthermore, the conversion may increase noise in the signal, reducing signal quality. However, in this second embodiment, the phase-modulated wireless signals cause a change in the probe signal without any processing (that is, it is a result of the interaction of the Rubidium-85 atoms in the RF detector with the local oscillator and wireless signals) and is therefore directly converted from the wireless signal to the optical domain such that it may be backhauled over the optical link to the core network. There is therefore no processing or performance cost in domain-conversion. This second embodiment may therefore enjoy reduced capital costs, reduced operational costs and greater signal quality compared to conventional base stations.

Figure 8:
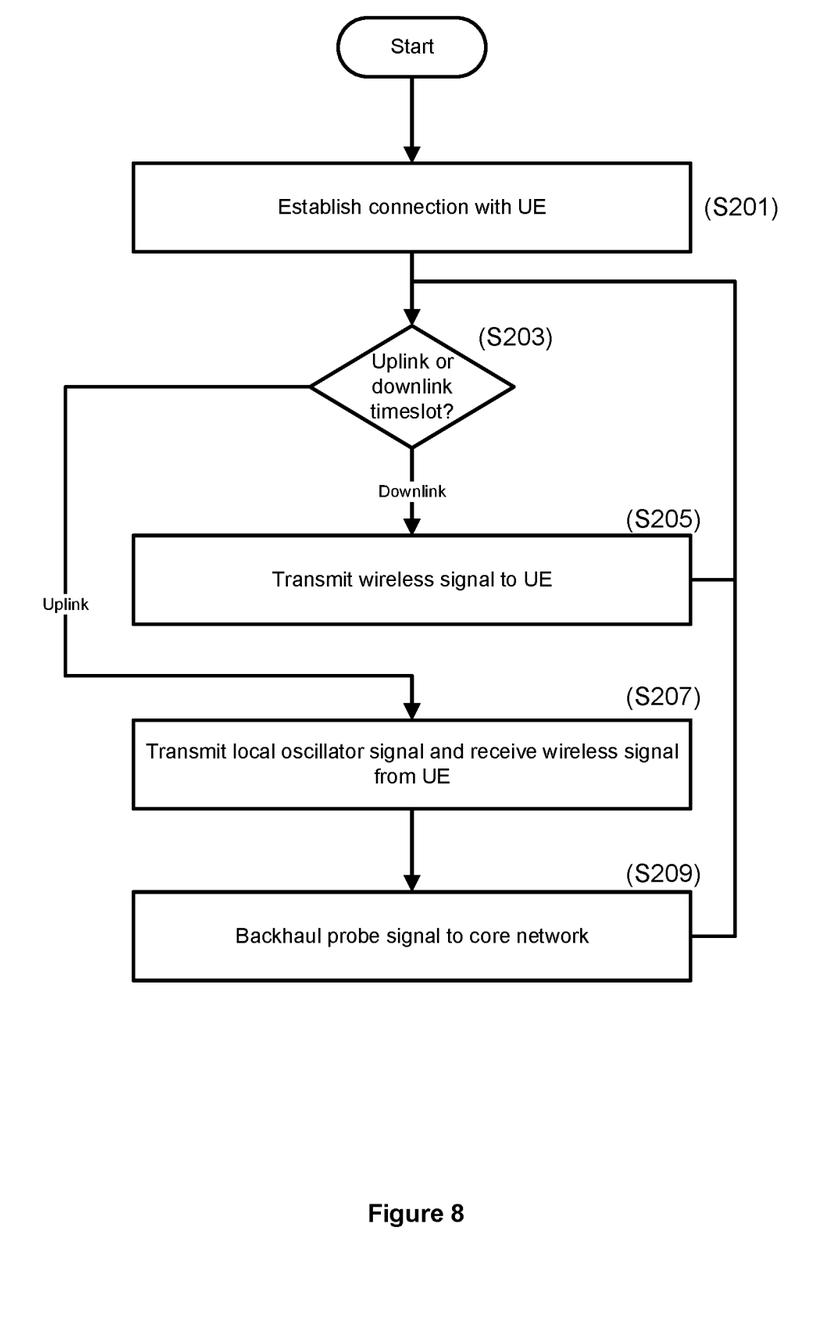
FIG. 8 is a flow diagram illustrating a second embodiment of a method of the present disclosure.

A second embodiment of a method of the present disclosure will now be described with reference to FIG. 8. In S201, the base station 100 establishes a connection with the UE 200 and adopts a time frame structure for communication, wherein the time frame includes a first set of timeslots for downlink communication and a second set of timeslots for uplink communication. In S203, the base station 100 determines whether it is entering a timeslot of the first set of timeslots for downlink communication or the second set of timeslots for uplink communication. In a first example, the base station 10 is entering a timeslot of the first set of timeslots and so proceeds to S205 in which it is configured to transmit wireless signals to the UE 200. At the end of the timeslot, the method loops back to S203. In a second example of S203, the base station 100 enters a timeslot of the second set of timeslots and so proceeds to S207 in which it is configured to 1) transmit a local oscillator signal and 2) receive the wireless signals from the UE 200. In S209, the base station 100 backhauls the received probe signal to the core network for processing and demodulation. At the end of the timeslot, the method loops back to S203.

In the second embodiment above, the received probe signal is converted to 1560 nm before being transmitted to the core network as the 1560 nm wavelength enjoys preferential long-range transmission characteristics in optical fiber (i.e. very low attenuation of approximately 0.3 dB/m) compared to the 780 nm probe signal. To enjoy preferential long-range transmission, the received probe signal may be converted to any wavelength between 1260 nm and 1625 nm. Nonetheless, the skilled person will understand that such wavelength conversion is non-essential.

The skilled person will also understand that it is non-essential that embodiments of the disclosure are performed by a base station. That is, any wireless transceiver in any form of wireless telecommunications network (such as a wireless wide area network or wireless local area network) may implement the present disclosure.

The skilled person will also understand that embodiments the present disclosure may be applied to many other electromagnetic signals of different frequencies. That is, for a particular target frequency, a system may be configured such that an EIT signal is produced on a probe signal by an incident electromagnetic signal at that target frequency (such as by selecting an appropriate atomic medium (e.g. Rubidium, Cesium or Strontium) having Rydberg states that correspond with that target frequency). Furthermore, it is also non-essential that the EIT signal is produced following a ladder configuration of electron transitions. That is, any configuration (e.g. Lambda, Vee) may be used. It is also non-essential that the atomic medium having Rydberg states corresponding with the target frequency is contained in an optical cavity of an optical fiber. That is, the atomic medium may be contained in other arrangements, such as a glass cell. It is also non-essential that the RF receiver uses one or more lasers to produce the probe and coupling signals. That is, any other optical transmitter or coherent optical transmitter may be used instead (such as a Light Emitting Diode).

Furthermore, the skilled person will understand that the present disclosure is not limited to the use of a 16-QAM modulation scheme, and any other phase-modulation scheme, such as Binary Phase Shift Keying (BPSK), Quadrature Phase Shift Keying (QPSK), or a higher order of QAM, may be used instead.

In the above embodiments, the difference between the frequency of the local oscillator signal and the wireless signal is around 30 kHz. However, this is non-essential. The frequency difference may be another value (for example, between 1 kHz and 10 MHz) selected so as to avoid another electron transition.

The skilled person will understand that any combination of features is possible within the scope of the disclosure, as claimed.

The invention claimed is:

1. A first wireless transceiver for a wireless telecommunications network, the wireless telecommunications network having a second wireless transceiver, wherein communications from the first wireless transceiver to the second wireless transceiver occur during a first timeslot and communications from the second wireless transceiver to the first wireless transceiver occur during a second timeslot, the first wireless transceiver comprising:
   a transmitter configured to transmit data to the second wireless transceiver during the first timeslot and further configured to transmit a local oscillator signal during the second timeslot; and
   an electromagnetic field receiver including a first optical transmitter, a second optical transmitter, and a transmission medium, wherein the first optical transmitter is configured to transmit a probe signal via the transmission medium at a probe frequency and the second transmitter is configured to transmit a coupling signal via the transmission medium at a coupling frequency, wherein the probe frequency is set to excite electrons of the transmission medium from a ground state to a first excited state and the coupling frequency is set to excite electrons of the transmission medium to a predetermined excited state so as to induce an Electromagnetic Induced Transparency (EIT) effect, wherein the electromagnetic field receiver is configured to receive, at the transmission medium and during the second timeslot, a phase-modulated signal from the second wireless transceiver and the local oscillator signal from the transmitter, wherein a combination of the phase-modulated signal and the local oscillator signal causes a detectable change of the probe signal from which a phase state of the phase-modulated signal can be detected.

2. The first wireless transceiver as claimed in claim 1, wherein the transmitter is configured to transmit data to the second wireless transceiver in a forward-facing main lobe and transmit the local oscillator signal in a rear-facing lobe.

3. The first wireless transceiver as claimed in claim 1, further comprising:
   an optical receiver for receiving the probe signal following the change caused by the combination of the phase-modulated signal and the local oscillator signal; and
   a processor configured to analyze the received probe signal to detect the phase state of the phase-modulated signal.

4. The first wireless transceiver as claimed in claim 3, wherein the phase-modulated signal is further modulated by amplitude and the processor is further configured to analyze the received probe signal to detect the amplitude of the phase-modulated signal.

5. The first wireless transceiver as claimed in claim 1, being a base station for a cellular telecommunications network.

6. The first wireless transceiver as claimed in claim 5, further comprising a backhaul communications interface configured to receive the probe signal, following the change caused by the combination of the phase-modulated signal and the local oscillator signal, and communicate the received probe signal to a core network of the cellular telecommunications network.

7. The first wireless transceiver as claimed in claim 6, further comprising a wavelength converter configured to convert the received probe signal to a wavelength between 1260 nm and 1625 nm, wherein the wavelength converted received probe signal is communicated to the core network.

8. A method of operating a first wireless transceiver in a wireless telecommunications network, the wireless telecommunications network having a second wireless transceiver, wherein communications from the first wireless transceiver to the second wireless transceiver occur during a first timeslot and communications from the second wireless transceiver to the first wireless transceiver occur during a second timeslot, wherein the first wireless transceiver comprises a transmitter and an electromagnetic field receiver, the electromagnetic field receiver including a first optical transmitter, a second optical transmitter, and a transmission medium, the method comprising:
   transmitting, by the first optical transmitter, a probe signal through the transmission medium at a probe frequency set to excite electrons of the transmission medium from a ground state to a first excited state;
   transmitting, by the second optical transmitter, a coupling signal through the transmission medium at a coupling frequency set to excite electrons of the transmission medium to a predetermined excited state so as to induce an Electromagnetic Induced Transparency (EIT) effect;

transmitting, by the transmitter, data to the second wireless transceiver during the first timeslot and a local oscillator signal during the second timeslot; and receiving, at the transmission medium of the electromagnetic field receiver and during the second timeslot, a phase-modulated signal from the second wireless transceiver and the local oscillator signal from the transmitter, wherein a combination of the phase-modulated signal and the local oscillator signal causes a detectable change of the probe signal from which a phase state of the phase-modulated signal can be detected.

9. The method as claimed in claim 8, wherein the first wireless transceiver further comprises an optical receiver and a processor, and the method further comprises:

receiving, at the optical receiver, the probe signal following the change caused by the combination of the phase-modulated signal and the local oscillator signal; and analyzing, at the processor, the received probe signal to detect the phase state of the phase-modulated signal.

10. The method as claimed in claim 9, wherein the phase-modulated signal is further modulated by amplitude and the method further comprises analyzing, at the processor, the received probe signal to further detect the amplitude of the phase-modulated signal.

11. The method as claimed in claim 8, wherein the first wireless transceiver is a base station of a cellular telecommunications network and further comprises a backhaul communications interface, and the method further comprises:

receiving, at the backhaul communications interface, the probe signal following the change caused by the combination of the phase-modulated signal and the local oscillator signal; and communicating, by the backhaul communications interface, the received probe signal to a core network of the cellular telecommunications network.

12. The method as claimed in claim 11, wherein the first wireless transceiver further comprises a wavelength converter, and the method further comprises converting, by the wavelength converter, the received probe signal to a wavelength between 1260 nm and 1625 nm, wherein the wavelength converted received probe signal is communicated to the core network.

13. A computer program comprising instructions which, when the program is executed by a computer, cause the computer to carry out the method of claim 8.

14. A non-transitory computer readable carrier medium comprising the computer program of claim 13.

* * * * *